(12) United States Patent
Kottke

(10) Patent No.: US 6,698,935 B2
(45) Date of Patent: Mar. 2, 2004

(54) ANTI-FRICTION BEARING

(75) Inventor: Joachim Kottke, Remseck (DE)

(73) Assignee: Andreas Stihl AG & Co., Waiblingen (DE)

( * ) Notice: Subject to any disclaimer, the term of this patent is extended or adjusted under 35 U.S.C. 154(b) by 0 days.

(21) Appl. No.: 10/096,306

(22) Filed: Mar. 15, 2002

(65) Prior Publication Data

US 2002/0131658 A1 Sep. 19, 2002

(30) Foreign Application Priority Data

Mar. 16, 2001 (DE) .......................... 101 12 641

(51) Int. Cl.[7] .......................... F16C 33/72; F16H 57/04
(52) U.S. Cl. ...................... 384/488; 74/606 R
(58) Field of Search ............................ 384/477, 478, 384/480, 488; 74/417, 606 R, 467

(56) References Cited

U.S. PATENT DOCUMENTS

| | | | | | |
|---|---|---|---|---|---|
| 2,275,996 A | * | 3/1942 | Searles | .......... | 384/477 |
| 2,582,525 A | * | 1/1952 | Brown | .......... | 384/477 |
| 3,250,580 A | * | 5/1966 | Sikora | .......... | 384/477 |
| 4,602,875 A | * | 7/1986 | Doerr et al. | .......... | 384/547 |
| 5,419,642 A | * | 5/1995 | McLarty | .......... | 384/486 |
| 5,993,343 A | * | 11/1999 | Rocca et al. | .......... | 474/135 |
| 6,263,752 B1 | * | 7/2001 | Tanaka | .......... | 74/467 |

* cited by examiner

*Primary Examiner*—Thomas R. Hannon
(74) *Attorney, Agent, or Firm*—Walter Ottesen

(57) ABSTRACT

An anti-friction bearing, especially for supporting a shaft (2) of a gear case (3), is provided for a portable handheld work apparatus. The anti-friction bearing has an inner race (4) and an outer race (6) surrounding the inner race (4) at a radial distance (5). Roller elements (7) are arranged between the outer race (6) and the inner race (4). A cover disc (8) is provided at the anti-friction bearing (1) in order to prevent a passage of lubricant (27) through the anti-friction bearing (1). The cover disc (8) extends radially from the inner race (4) to an inner edge (9) of the outer race (6). The inner edge (9) faces axially toward the roller elements (7). A narrow radial gap (10) is provided between the cover disc (8) and the inner edge (9). The axial elevation (33) of a radial outer edge (28) of the cover disc (8) is equal to or less than the axial elevation (34) of the inner edge (9). The cover disc (8) is connected seal-tight to the inner race (4) and functions, during rotational operation of the anti-friction bearing, to throw off via centrifugal force lubricant striking the cover disc (8). In this way, a passage of lubricant through the anti-friction bearing (1) from the gear case is prevented.

11 Claims, 3 Drawing Sheets

ANTI-FRICTION BEARING

FIELD OF THE INVENTION

The invention relates to an anti-friction bearing and especially an anti-friction bearing for supporting a shaft of a gear case for a portable handheld work apparatus.

BACKGROUND OF THE INVENTION

Anti-friction bearings are known for supporting a rotating shaft which include a device for repelling a lubricant. The anti-friction bearing is essentially formed of an inner race and an outer race which surrounds the inner race at a radial spacing. Roller elements are provided radially between the inner race and the outer race. The shaft engages centrally through an eye of the inner race. An annular disc is mounted on the shaft to rotate therewith and is at an axial spacing to the anti-friction bearing. The annular disc functions to throw off lubricant, which reaches the roller bearing, with centrifugal force during the rotating operation of the shaft. If such an anti-friction bearing is built into a housing wall of a housing filled with lubricant, then a corresponding loss of lubricant occurs because of passage through the anti-friction bearing.

SUMMARY OF THE INVENTION

It is an object of the invention to provide an anti-friction bearing wherein a loss of lubricant because of passage through the anti-friction bearing is avoided during operation and even at high temperatures.

The anti-friction bearing of the invention includes an anti-friction bearing for rotatably journalling a shaft of a gear case of a portable handheld work apparatus. The anti-friction bearing includes: an inner race; an outer race surrounding the inner race at a radial spacing therefrom; a plurality of roller elements disposed between the inner and outer races; a cover disc connected to the inner race; the outer race having an axial inner edge facing toward the roller elements and the inner edge having an axial elevation; the cover disc being arranged in a manner of a seal and extending radially up to the inner edge; the cover disc and the inner edge conjointly defining a radial gap; and, the cover disc having a radial outer edge and the radial outer edge having an axial elevation equal to or less than the axial elevation of the inner edge.

The anti-friction bearing is radially covered by a cover disc which is connected to the inner race of the bearing. In this way, lubricant is especially prevented from axially passing the roller bearing. According to the invention, the cover disc is configured in the manner of a seal which extends from the inner race radially out to an axial inner edge of the outer race which edge faces the roller elements. A minimal radial gap is provided between the cover disc and the axial inner edge of the outer race in order to avoid rubbing between the cover disc and the outer race. If, during the rotational operation of the anti-friction bearing, lubricant reaches the cover disc in the axial direction of the shaft, then the lubricant is tangentially and radially thrown from the cover disc under the action of centrifugal forces without significant volumetric portions of the lubricant reaching the anti-friction bearing through the radial gap and without passing the anti-friction bearing.

In order to make possible a problem-free centrifugal throw-off of the lubricant from the cover disc, it is practical to place the cover disc in the outline of the anti-friction bearing at least in the region of the radial gap, that is, at least the axial elevation of the radial outer edge of the cover disc is equal to or less than the axial elevation of the axial inner edge of the outer race. It can also be practical to so position the end face of the cover disc in the anti-friction bearing that the axial elevation of the end face is equal to or less than the axial elevation of the inner edge. This end face faces away from the anti-friction bearing.

It is practical to form the cover disc as a pressure-insensitive metal part which is resistant to bending. The cover disc is connected at least to a radial outer surface of the inner race to achieve a seal-tight connection of the inner race to the cover disc. It can also be practical to fix the cover disc between a collar on the shaft and an end face of the inner race. Preferably, the cover disc is pressed against the inner race.

To increase the resistance to bending of the cover disc, it is practical to configure the cover disc as being offset in the radial course of its cross section. All types of anti-friction bearings (especially single-row or multiple-row groove ball bearings) are suitable for mounting the cover discs on anti-friction bearings. Anti-friction bearings having corresponding cover discs can also be sealed against the loss of lubricant depending upon the application of the anti-friction bearing.

The anti-friction bearings according to the invention are suitable especially for use for supporting shafts which project through lubricant-filled housings such as gear cases of portable handheld work apparatus such as brushcutters or string trimmers. Here, it is practical to so arrange the particular cover discs of the anti-friction bearings that the cover discs lie in the interior of the particular gear case.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
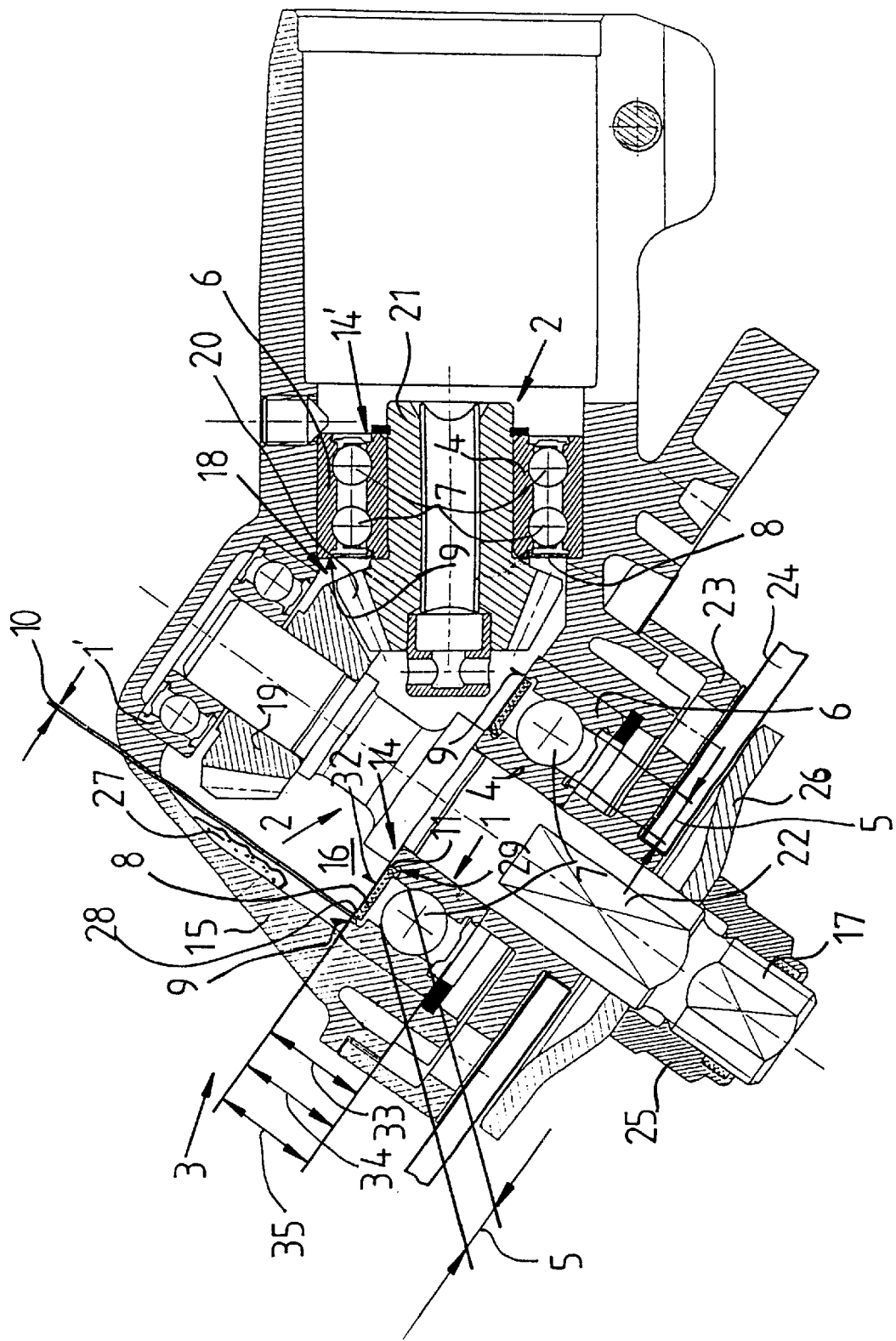
FIG. 1 is a longitudinal section view through a gear case of a portable handheld work apparatus having anti-friction bearings in accordance with the invention.

FIG. 1 shows a longitudinal section through a gear case 3 of a motor-driven portable handheld work apparatus such as a brushcutter. The gear case 3 includes a housing 15 in which a shaft 2 and an output shaft 17 of an epicyclic gear unit 18 are arranged. The shaft 2 extends over the elevation of the housing 15 and the epicyclic gear unit is configured as a bevel gear unit 18. The output shaft 17 is held by two anti-friction bearings (1, 1') in the housing 15. The anti-friction bearing 1 is configured as a single-row grooved ball bearing 14.

A bevel gear 19 is held between the anti-friction bearings (1, 1') on the output shaft 17 so as to rotate therewith and, in the mounted state of the gear case 3, the bevel gear 19 is held axially so that it cannot be displaced. The bevel gear 19 meshes with a further bevel gear 20 of a further shaft 2, namely, a drive shaft 21. The output shaft 17 projects out of the housing 15 at an axial region. The output shaft 17 has planar surfaces 22 on its periphery at this axial region for mounting a holding element 23 so that it rotates with the shaft. The holding element is pushed onto the output shaft 17. The holding element 23 functions as an axial stop for a cutting tool 24 shown only partially. The cutting tool 24 is held on the output shaft 17 with the aid of a tightening nut 25 and a thrust washer 26. The thrust washer 26 is mounted axially between the tightening nut 25 and the cutting tool 24. The drive shaft 21 is supported in the housing 15 with the aid of a two-row groove ball bearing 14'. As shown, the output shaft 21 is mounted so as to be overhung.

Figure 2:
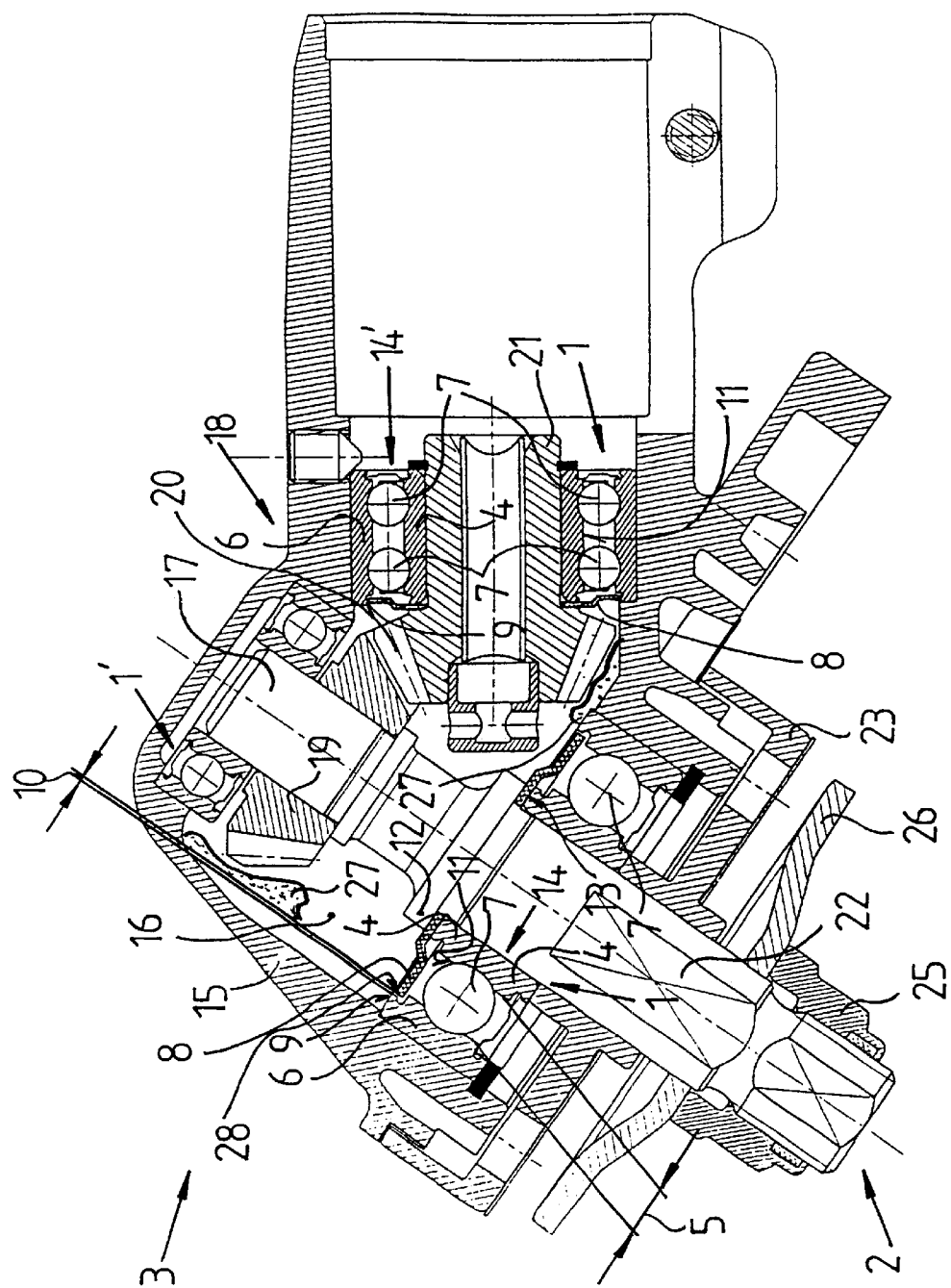
FIG. 2 is a further embodiment of the anti-friction bearing according to the invention built into a gear case of a portable handheld work apparatus.

FIG. 2 shows a further gear case 3 in longitudinal section wherein the anti-friction bearings 1 of the gear case 3 are configured as grooved ball bearings (14, 14'). The anti-friction bearings 1 are essentially formed of an inner race 4 and an outer race 6 surrounding the inner race 4 at a radial spacing 5. Roller elements 7 are held form-tight so as to be movable between the inner race 4 and the outer race 6 for an approximately play-free rolloff of the inner race 4 relative to the outer race 6. During operation of the gear case 3, the drive shafts rotate at a rotational speed of approximately 10,000 rpm in the embodiments shown in FIGS. 1 and 2. In this way, a considerable warming of the entire gear case and the lubricant 27 contained therein is effected. The lubricant 27 is thereby made to have a low viscosity and tends to especially pass the anti-friction bearings (14, 14') axially whereby a loss of lubricant of the gear case can occur.

In order to avoid such a loss of lubricant, the anti-friction bearings are provided with a cover disc 8 at their ends facing toward the interior 16 of the housing 15.

The cover disc 8 is connected form-tight, force-tight or material-tight to the inner race 4 of the particular anti-friction bearing. The cover disc 8 extends in radial direction up to an inner edge 9 of the outer race 6 of the anti-friction bearing. The inner edge 9 faces axially toward the roller elements 7. A radial gap 10 is formed between the particular cover disc 8 and the corresponding inner edge 9. A rubbing between the cover disc 8, which rotates during operation of the gear case, and the stationary outer race 6 is avoided because of the gap 10.

During operation of the gear case 3, lubricant 27, which reaches the cover disc 8, is thrown off tangentially and radially from the cover discs by centrifugal force. In this way, the situation is prevented that the lubricant can axially pass the anti-friction bearings which would otherwise lead to increased lubricant losses to the gear case. In order to effect a centrifugal throw-off of the lubricant from the particular cover disc 8, the cover disc 8 is embedded in the bearing contour of the particular anti-friction bearing 1. At least a radial outer edge 28 of the cover disc 8 is embedded in the bearing contour of the anti-friction bearing. The particular cover disc 8 is so mounted that at least an axial elevation 33 of the radial outer edge 28 of the cover disc 8 is equal to or less than the axial elevation 34 of the inner edge 9 of the outer race 6. As shown in FIG. 1, the axial elevation 35 of an entire end face 32 of the cover disc 8 is preferably equal to or less than the axial elevation 34 of the inner edge 9. The end face 32 faces away from the anti-friction bearing 1. The cover disc 8 and the axial inner end face of the outer race 6 form a common plane planar to the interior space. The lubricant 27 which passes through the gap 10 functions to lubricate the anti-friction bearing 1.

The cover disc 8 is preferably configured to be resistant to bending and is connected to a radial outer wall surface 11 of the inner race 4 in the embodiment shown in FIG. 1. The cover disc 8 is especially mounted and pressed into a groove 29 in the wall surface 11. In this way, a lubricant-tight connection of the cover disc 8 to the inner race 4 is provided.

As shown in FIG. 2, it can be practical to fix the cover disc 8 between a collar 12 on the shaft 2 and an end face 13 of the inner race 4. The cover discs 8, which are shown in FIG. 2, thereby have a course which is radially offset in cross section.

Figure 3:
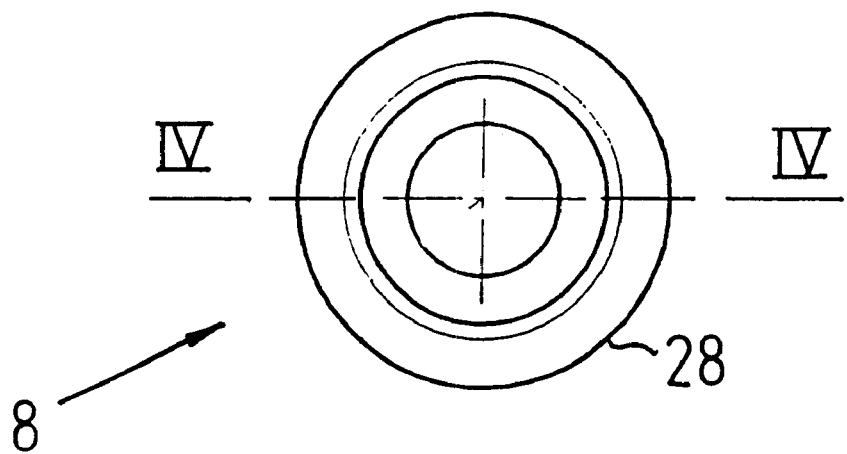
FIG. 3 is a plan view of a cover disc provided in the embodiment of FIG. 2; and, FIG. 4 is a section view taken through the cover disc along line IV—IV of FIG. 3.
Figure 4:
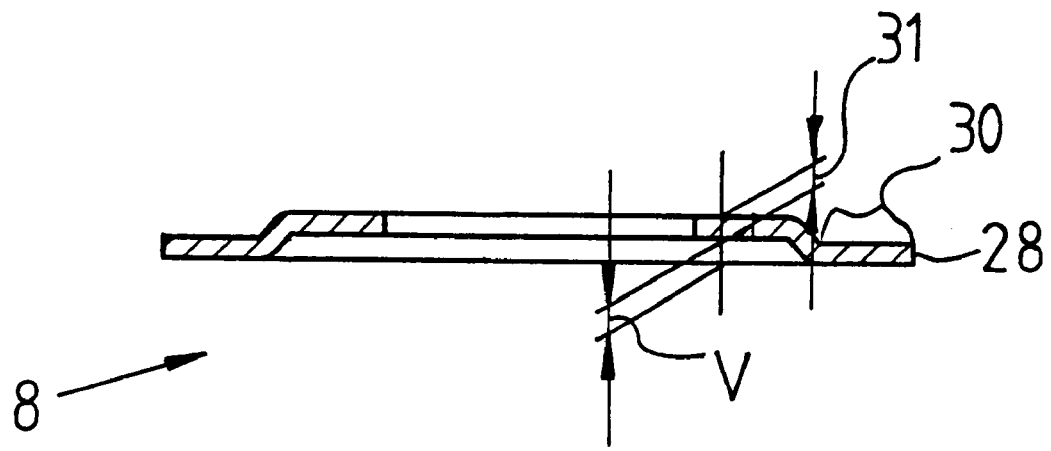

FIG. 4 shows a cross section through the cover disc 8 along line IV—IV of FIG. 3. As FIG. 4 shows, the offset is effected as an axial offset of the annular disc-shaped edge region 30 of the cover disc 8 by an offset amount V which corresponds approximately to the material thickness 31 of the cover disc 8.

It is understood that the foregoing description is that of the preferred embodiments of the invention and that various changes and modifications may be made thereto without departing from the spirit and scope of the invention as defined in the appended claims.

What is claimed is:

1. A gear case assembly of a portable handheld work apparatus, the gear case assembly comprising:

a gear case defining an interior space for holding a lubricant;

a shaft;

an anti-friction bearing for rotatably journalling said shaft in said gear case;

said anti-friction bearing including:

an inner race;

an outer race surrounding said inner race at a radial spacing therefrom;

a plurality of roller elements disposed between said inner and outer races;

a cover disc connected to said inner race and radially covering said anti-friction bearing so as to receive deposits of said lubricant thereon during operation of said work apparatus;

said outer race having an axial inner edge facing toward said roller elements and said inner edge having an axial elevation;

said cover disc being arranged to extend radially up to said inner edge;

said cover disc and said inner edge conjointly defining a radial gap so as to permit a pressure equalization of said interior space; and, said cover disc having a radial outer edge and said radial outer edge having an axial elevation equal to or less than said axial elevation of said inner edge so as to permit said deposits of lubricant to be flung radially over and beyond said radial gap by centrifugal force thereby preventing said deposits from passing through said anti-friction bearing.

2. The gear case assembly of claim 1, said cover disc having an end face facing away from said anti-friction bearing; and, said end face having an axial elevation equal to or less than said axial elevation of said inner edge.

3. The gear case assembly of claim 2, said cover disc being resistant to bending.

4. The gear case assembly of claim 3, said cover disc being made of metal.

5. The gear case assembly of claim 2, said inner race having a radial outer lateral surface; and, said cover disc being connected to said radial outer lateral surface of said inner race.

6. The gear case assembly of claim 2, said inner race having an end face facing away from said roller elements and said shaft having a collar thereon; and, said cover disc being fixedly connected between said end face of said inner race and said collar.

7. The gear case assembly of claim 1, said cover disc being pressed onto said inner race.

8. The gear case assembly of claim said cover disc being offset when viewed in cross section.

9. The gear case assembly of claim 1, said anti-friction bearing being a single-row groove ball bearing or a multi-row groove ball bearing.

10. The gear case assembly of claim 1, wherein said anti-friction bearing is so mounted in said gear case that said cover disc faces toward the interior of said gear case.

11. The gear case assembly of claim 1, wherein said radial gap is a minimum radial gap in order to avoid rubbing between said cover disc and said outer race.

* * * * *

UNITED STATES PATENT AND TRADEMARK OFFICE
CERTIFICATE OF CORRECTION

PATENT NO. : 6,698,935 B2
DATED : March 2, 2004
INVENTOR(S) : Joachim Kottke

It is certified that error appears in the above-identified patent and that said Letters Patent is hereby corrected as shown below:

Column 5,
Line 10, -- 1, -- should be inserted between "claim" and "said".

Signed and Sealed this

Twenty-ninth Day of June, 2004

JON W. DUDAS
*Acting Director of the United States Patent and Trademark Office*